United States Patent
Latva-Aho et al.

(10) Patent No.: US 7,266,393 B2
(45) Date of Patent: Sep. 4, 2007

(54) CONNECTING ACCESS POINTS IN WIRELESS TELECOMMUNICATIONS SYSTEMS

(75) Inventors: Antti Latva-Aho, Tampere (FI); Risto Suoranta, Tampere (FI)

(73) Assignee: Nokia Corporation, Espoo (FI)

( * ) Notice: Subject to any disclaimer, the term of this patent is extended or adjusted under 35 U.S.C. 154(b) by 513 days.

(21) Appl. No.: 09/827,208

(22) Filed: Apr. 5, 2001

(65) Prior Publication Data

US 2001/0046839 A1  Nov. 29, 2001

(30) Foreign Application Priority Data

Apr. 7, 2000 (FI) .................................. 20000841

(51) Int. Cl.
*H04B 1/38* (2006.01)
(52) U.S. Cl. .................... 455/561; 455/456.5; 455/560
(58) Field of Classification Search ................ 455/411, 455/426.1, 422.1, 410, 558, 561, 554, 305, 455/41.2, 426.2, 73, 456.5, 554.2, 560; 370/352, 370/338; 709/217, 218, 219
See application file for complete search history.

(56) References Cited

U.S. PATENT DOCUMENTS

| 5,448,569 | A | | 9/1995 | Huang et al. ............... 370/95.1 |
| 5,991,641 | A | * | 11/1999 | Goni et al. .................. 455/557 |
| 6,115,376 | A | * | 9/2000 | Sherer et al. ............... 370/389 |
| 6,374,112 | B1 | * | 4/2002 | Widegren et al. ......... 455/452.2 |
| 6,594,240 | B1 | * | 7/2003 | Chuah et al. ............... 370/328 |
| 6,657,981 | B1 | * | 12/2003 | Lee et al. .................... 370/331 |
| 6,665,529 | B1 | * | 12/2003 | Mills, Jr. ..................... 455/411 |
| 6,697,355 | B1 | * | 2/2004 | Lim ........................... 370/352 |
| 6,791,956 | B1 | * | 9/2004 | Leu ............................ 370/328 |
| 2002/0012433 | A1 | * | 1/2002 | Haverinen et al. .......... 380/247 |

FOREIGN PATENT DOCUMENTS

| DE | 19527715 | 2/1997 |
| GB | 2343337 A | 5/2000 |
| WO | WO 00/02406 | 1/2000 |
| WO | WO 00/18067 | 3/2000 |

OTHER PUBLICATIONS

3GPP specification TS.31.101 "UICC Terminal Interface; Physical and Logical Characteristics", 59 page document.
"Re-Configurable Radio Systems & Networks", Beach et al., 3G Mobile Communication Technologies, Conference Publication No. 471, IEE 2000, pp. 321-325.

* cited by examiner

*Primary Examiner*—Edward F. Urban
*Assistant Examiner*—Raymond S. Dean

(57) ABSTRACT

A method of connecting an access point to other network elements in a wireless telecommunication system having at least one access point offering wireless connections, and at least one fixed network part, includes storing data on an IC card for connecting at least one access point to a functional connection with the fixed network part. The IC card is connected to a functional connection with the access point when the access point is to be connected to the fixed network part. Necessary resources of the fixed network part are connected to a functional connection with the access point on the basis of said stored data. As a precondition for the connection, the IC card's rights to use the resources of the fixed network part can be checked in the fixed network part.

20 Claims, 3 Drawing Sheets

CONNECTING ACCESS POINTS IN WIRELESS TELECOMMUNICATIONS SYSTEMS

BACKGROUND OF THE INVENTION

1. Field of the Invention

The invention relates to connecting an access point to other network elements in wireless telecommunication systems.

2. Brief Description of Related Developments

In addition to PLMN mobile networks (Public Land Mobile Network), mainly owned and controlled by mobile operators, various wireless private networks have been designed for the needs of companies, for example. These wireless private networks are typically WLAN networks (Wireless Local Area Network), which have a short service range and which offer a wireless connection inside an office, for example. Important wireless network standards, mainly intended for private use, include the IEEE802.11 WLAN standard, the TETRA standard (Trans-European Trunked Radio), and the DECT standard (Digital European Cordless Telecommunications). The third generation mobile system UMTS (Universal Mobile Telecommunications Systems), designed by 3GPP ($3^{rd}$ Generation Partnership Project), is a system in which the WCDMA technology (Wideband Code Division Multiple Access) will be used on the radio path. In the WCDMA system, all terminals in a cell use the same mutual frequency on the transmission path from a to a base station, and, similarly, the same mutual frequency on the transmission path from a base station to a terminal. In association with mobile systems, the WCDMA system can be implemented either as frequency division channelling (FDD mode, Frequency Division Duplex) or as time division channelling (TDD mode, Time Division Duplex). The TDD mode is designed to be used particularly in small pico cells, which could be used for instance to cover the inner wireless communication within a company's buildings. For this purpose, QPSK modulation can be used, enabling downlink rates of 5.7 Mbps without encoding, and in the future, 16QAM modulation (Quadrature Amplitude Modulation), enabling downlink rates of as much as 11.4 Mbps.

In the present application, the term access point in a wireless telecommunication system refers to any network element or an aggregate of several network elements, which participates in offering a wireless connection to a terminal either directly or indirectly. The access point can be for example a base station, a radio network controller (or base station controller) controlling one or several base stations, or an entity including a base station and a radio network controller. Although mainly operators currently manage the access points of PLMN networks, such as the GSM or UMTS networks, in future an increasing number of PLMN network access points may also be in private use. Private use refers to use by both individuals and organizations. Furthermore, operators may be motivated to turn over the management of the access point network to other parties, for example as subcontracting. However, connecting access points to other network elements in a telecommunication system causes problems. An operator managing the other network elements, such as the core network, has no efficient way to control the connection of access points to the other network elements. Connecting an access point to the other parts of a telecommunication system requires adjustment of the settings, and consequently, moving access points or taking new access points into use cannot be carried out easily and rapidly. Connections from access points to other network elements can be arranged through public networks, such as the Internet, which brings about security risks.

SUMMARY OF THE INVENTION

It is an object of the present invention to provide a new method of using access points. The objects of the invention are achieved by a method, a wireless telecommunication system, and an access point in the wireless telecommunication system, which are characterized by what is disclosed in the independent claims. The preferred embodiments of the invention are disclosed in the dependent claims.

The invention is based on the idea of using IC cards (Integrated Circuit) in access points. Data for functionally connecting an access point to a fixed network part is stored on the IC card. The fixed network part may comprise one or several substantially fixed network elements that offer network services. When an access point is to be connected to a fixed network part, the IC card is functionally coupled to the access point. Necessary resources of the fixed network part are connected in a functional connection with the access point on the basis of said stored data.

This brings about the advantage that new access points can be more easily connected to other network elements, since the necessary data is already stored on the IC card. Furthermore, operators are provided with a new dynamic way to integrate the network resources that a customer is liable for into the operator's telecommunication network. The operator may supply a selected party with the IC card containing the data required for connecting an access point. This enables a flexible and safe way to use private access points and to temporarily use rentable access points, for example, by means of the data on the IC card. The use of an IC card in access points offers an operator the chance to assign the management of the access points to a selected party or to purchase the services offered by the access points.

In accordance with a preferred embodiment of the invention, a check is made in the fixed network part to find out whether an IC card is entitled to use the resources of a fixed network part. If the IC card is entitled to use the resources of the fixed network part, the necessary resources of the fixed network card are functionally connected to the access point.

This preferred embodiment provides the advantage that the owner of the fixed network part is able to easily and reliably control that only authorized parties (whose IC cards have sufficient rights) are entitled to connect their access points, for example base stations, to other network elements.

In accordance with other preferred embodiments of the invention, the IC card is authenticated in a fixed network part, and the traffic between an access point and the fixed network part is ciphered on the basis of the data on the IC card. This ensures that the IC card is authentic, and that the traffic between the access point and the fixed network part can be transferred safely also through a public network.

BRIEF DESCRIPTION OF THE FIGURES

In the following the invention will be described in greater detail in conjunction with preferred embodiments with reference to the attached drawings, in which.

DETAILED DESCRIPTION OF THE INVENTION

The invention is applicable to any wireless telecommunication system comprising access points. In the following, a preferred embodiment of the invention will be described in the UMTS system, without, however, restricting the invention thereto.

Figure 1:
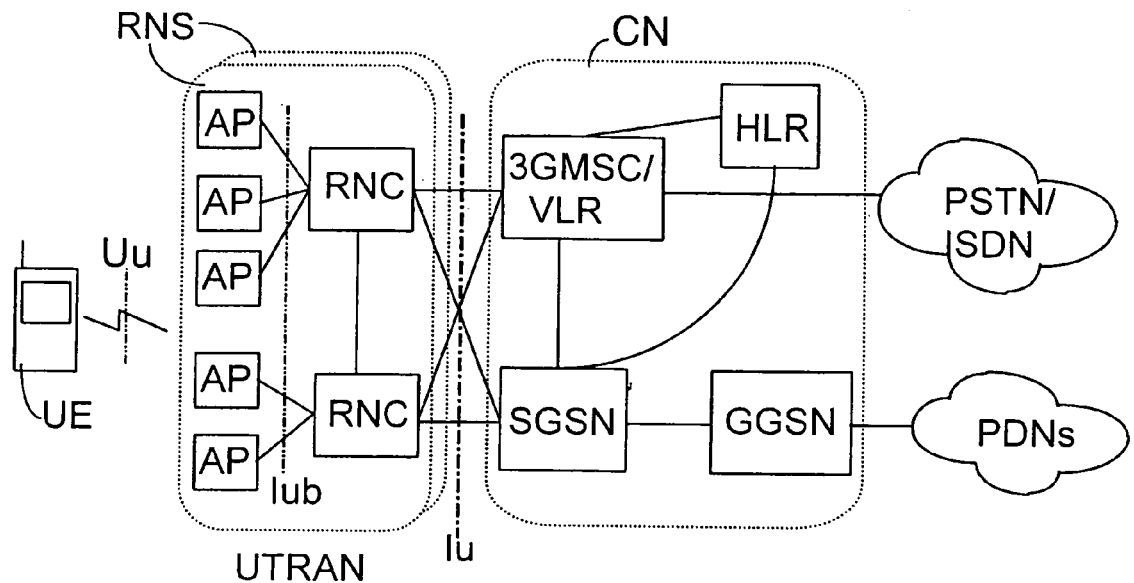
FIG. 1 shows a UMTS system.

Referring to FIG. 1, the structure of a UMTS system will be described by way of example. The main components of the UMTS system include a core network CN, a UMTS terrestrial radio access network UTRAN, and a mobile station or user equipment UE. The interface between the CN and the UTRAN is called Iu, and the air interface between the UTRAN and the UE is called Uu.

The UTRAN is typically composed of a plurality of radio network subsystems RNS, the interface between which is called Iur (not shown). The RNS is composed of a radio network controller RNC and one or more base stations or nodes B, under the control of the RNC and called access points AP in the embodiment shown in FIG. 1. The interface between the RNC and the AP is called Iub. The RNC attends to the reservation and control of the transfer resources of the Iub interface. Mainly the RNC controls the resources of the AP. The RNC relays necessary system data to the AP. The RNC controls shared channels and common channels, such as paging channels. The RNC also mainly controls dedicated channels and makes decisions on handovers of connections reserved for the UE. When required, the access point relays different measurement reports on power and interference levels, for example. The synchronization of access points AP and radio network controllers is also carried out at the Iub interface.

The UE can be e.g. a fixedly placed, vehicle-mounted or handheld portable terminal. The UE typically comprises a USIM application (UMTS Subscriber Identity Module), stored on the IC card and used for identification of the right user by means of the PIN (Personal Identity Number), for authentication of the USIM application in the CN, for representing the user (who may be a subscriber) in the CN, and for ciphering the connection between the UE and the AP.

It should be noted that the UMTS system is so designed that the CN can be based on for example the core network of the GSM system, whereby there is no need to rebuild the entire network infrastructure. A core network CN, based on the GSM system, is composed of an infrastructure that is exterior to the UTRAN and part of the mobile communication system. A mobile switching centre 3GMSC/VLR comprising a visitor location register VLR typically attends to circuit-switched connections, and connections can be arranged from the centre to exterior networks, such as an analog (PSTN, Public Switched Telephone Network) or a digital ISDN network (Integrated Services Digital Network), or to the Internet.

The CN may also include a packet radio system, which is based on the GPRS technique (General Packet Radio Service) and comprises a gateway GPRS support node GGSN and a serving GPRS support node SGSN. The SGSN serves to detect user equipment capable of GPRS connections within its service area, to transmit and receive data packets from said equipment and to monitor the location of the equipment within its service area. The GGSN acts as a gateway between the GPRS network and an external data network PDN (Packet Data Network). External data networks include for example the GPRS network of another network operator, the Internet, the X.25 network or a private local area network. The SGSN communicates with said data networks over an interface Gi. The SGSN and the 3GMSC/VLR utilize a home location register HLR, which substantially permanently comprises subscriber data. As to a more detailed description of the UMTS system, reference is made to the 3GPP UMTS specifications.

Figure 2:
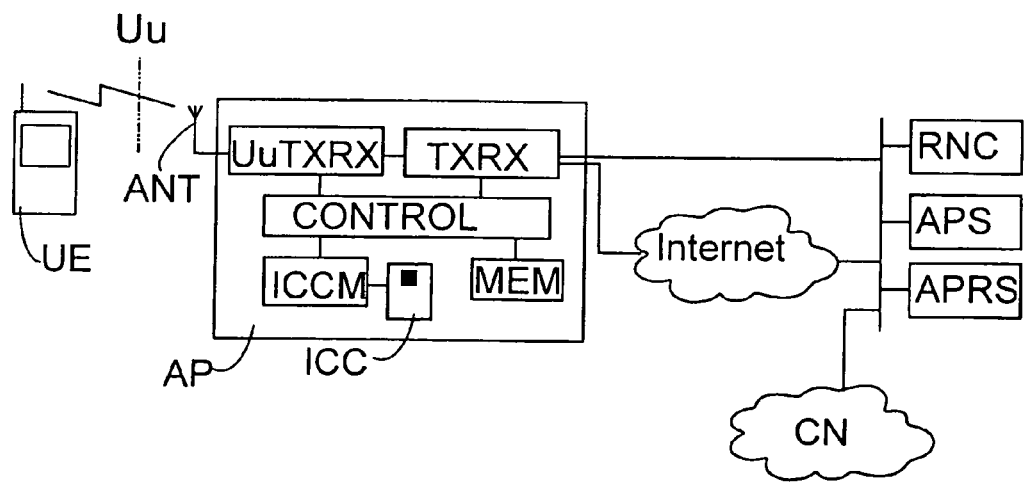
FIG. 2 shows a wireless telecommunication system according to a preferred embodiment of the invention.

FIG. 2 shows a UTRAN radio network according to a preferred embodiment of the invention, wherein an access point AP acts as a base station. The user equipment UE can communicate with the AP over a radio interface Uu. An IC card ICC having data stored onto it can also be coupled to the AP, and the data may be needed in the activation of the access point and/or in connecting the access point to a fixed network part, particularly to a radio network controller RNC and further to a core network CN. 'A fixed network part' is a common term for any one or several network elements providing substantially wired connections; in FIG. 2 the resources of the fixed network part comprise, among other things, a radio network controller RNC. An IC card ICC typically refers to a credit card-size plastic card to which a microprocessor and memory have been installed.

An access point AP comprises transceiver means TXRX, typically a plurality of radio interface (Uu) transceivers UuTXRX, and card means ICCM for using at least one IC card ICC at the AP. The AP further comprises memory MEM and a logical control unit CONTROL which controls the operation of the transceivers UuTXRX, the transceiver means TXRX and the card means ICCM by means of the memory MEM. The control unit CONTROL can be implemented for example as software to be executed in a processor. The transceiver means TXRX serve to set up a bi-directional connection to elements of the fixed network part, such as the RNC, and they can be used for transferring the traffic and control channels used by a plurality of transceivers UuTXRX to the Iub interface link. The transceivers UuTXRX at the AP radio interface have a connection to an antenna unit ANT, which is used to implement a bi-directional radio connection to at least one user equipment UE.

As FIG. 2 illustrates, the AP can communicate with the fixed network part for instance via the Internet. If the connection between the AP and the fixed network part is arranged over a public network, the data comprised by the IC card ICC can preferably also be utilized for ciphering the data to be transmitted. Firewalls, not shown in FIG. 2, are also typically used. The connection may be arranged by using the data comprised by the ICC to set up a virtual private network VPN, whereby the IP packets to be sent are sent encapsulated over the Internet, and, consequently, the connection used is protected. The link-level connection between the AP and the fixed network part can be implemented by the Ethernet or ATM technique (Asynchronous Transfer Mode), for example.

The fixed network part preferably comprises an access point register server APRS and an access point server APS for supporting the use of the IC card ICC. The APRS typically comprises a database, which is generated by the issuer of the IC card and substantially permanently comprises data on the IC cards ICC assigned for access points. The APRS preferably comprises data on the owner of an ICC, data for the authentication of a card ICC, and information on whether an ICC has the right to use the resources of the fixed network part. The data is preferably sorted on the ICC in accordance with a specific identity, and the APRS may further comprise more exact data on the resources or settings allowed for an ICC. The APRS also comprises means for using the data in the database, for storing and processing the data and for generating commands.

In accordance with a preferred embodiment of the invention, address data on the access point register server APRS is stored on an IC card ICC fed to an access point AP. In this case, when the AP is to be connected to the resources of a fixed network part by the use of the ICC, the connection is set up to the APRS. When the APRS allows, the AP can be connected preferably to the radio network controller RNC of the fixed network part by means of the access point server APS selected by the APRS. As opposed to FIG. 2, the APRS can also be located in a network different from that of the RNC, since the APRS is typically operator-specific, and not as such bound to any radio network. In this case the connection to the APRS can also be set up in via some other part than the RNC.

According to instructions from the APRS, the access point server APS participates locally in connecting an AP to the resources of a fixed network part, a particularly to the radio network controller RNC. The main functions of the APS include the allocation of an RNC (RNC allocation) to the AP, and, if need be, the configuration of the selected RNC to support the AP. Further, if need be, the APS participates in reserving the other necessary network resources for the AP, such as the set-up of a functional connection to the core network CN. An APS typically manages a plurality of radio network controllers RNC; it is also possible that the APS is RNS radio sub network-specific, i.e. is associated with a given RNC. The APS may also offer support for the mobility of access points AP, i.e. it may select an RNC having free resources for the AP within an operator's operating area. The APS may, for example, select the nearest radio network controller to serve the AP. Furthermore, inter-operator roaming agreements allow an AP broader mobility within the operating areas of other operators (network roaming). This is particularly advantageous as access points AP diminish in size and become more easily movable. An APS may also dynamically manage the load on the different network parts by changing the connections of the access points AP to different network elements according to the current load on the network. Such network elements include, for example, radio network controllers RNC, synchronization servers and other common decentralized network resources. A separate access point server APS is not absolutely necessary, at least in radio network controllers RNC under the same operator, the APRS can comprise the functionality required for selecting the RNC.

An access point AP may be, for instance, a base station owned by an individual or company, in which case the IC card ICC can be offered by the operator attending to the radio network controller RNC and/or the core network CN. In the preferred embodiment illustrated in FIGS. 2 and 4, the data comprised by the ICC is a requirement for the use of the data transmission services offered by the RNC and, further, the CN. The operator may assign an ICC to selected reliable parties who have the right to connect their AP to the operator's fixed network part and to utilize the resources of the network part. The ICC may be authenticated, and this way the operator can make sure that only an authorized party is able to connect its AP to the operator's network elements. This enables a flexible and safe way to use private access points and allows the temporary use of, for example, rentable access points by means of the data comprised by the IC card. A geographically extensive coverage area is subject to a large number of access points, whose maintenance costs could be quite high. The use of an IC card at an AP offers an operator the chance to assign the management of the access points AP to a selected party or to purchase the services offered by the access points. This significantly decreases the maintenance work required, and allows operators to concentrate more on the services offered by the CN. An operator is also able to expand more easily by purchasing access point services from outside. Furthermore, even though the access points and the fixed network part were managed by the same operator, the use of an IC card according to the preferred embodiment of the invention allows the operator to safely use a public network, such as the Internet, between an access point and the fixed network part.

The data stored on an IC card ICC is mainly data stored by the owner of the access point register server APRS, for example a core network operator, as is illustrated in table 1.

TABLE 1

| Data comprised by an IC card |
|---|
| Specific identity |
| APRS address |
| Data associated with authentication: |
| one or more necessary secret keys |
| necessary algorithms |
| Command sequences/applications to be executed |
| Other data: |
| access point configuration data |
| data associated with system operation and maintenance, to be assembled during operation |

An ICC comprises a specific identity on the basis of which the data on the ICC can be separated from other data comprised by the access point register server APRS. To be able to set up a connection to the APRS, the network address of the APRS (APRS address) is stored on the IC card. The APRS address can be, for example, an IP address or a URL identifier (Uniform Resource Locator). The ICC comprises data, such as one or more secret keys and necessary algorithms, for authenticating the card and, if need be, for ciphering the connection between the access point and the fixed network element, typically a radio network controller RNC. The above data are essential for the operator to be able to allow an access point AP comprising an IC cart to be connected more permanently to the network.

Since an ICC typically comprises a processor CPU, the data stored on the ICC may also include executable command sequences, i.e. applications. The applications serve to implement operations associated with the use, maintenance, monitoring and handling of exceptional conditions in the system and particularly the access point AP. Processing cipher key(s) on an ICC is a typical example of an application stored on a card. Executable programs can be stored on an ICC either in advance, as part of the programming of the card before it is taken into use, or they can be loaded dynamically by the utilizing a telecommunication network.

The operator who owns the IC card ICC can for example store applications allowing the operator to gain information on the use of the access point AP. At given intervals or on the basis of a request submitted by the operator, an application on an ICC may assemble data on, for example the number of users, and transmit this data to the access point server APS by using the connection between the AP and the fixed network part. The applications comprised by an ICC can preferably be controlled by control software on the APS, the software allowing further utilization of the data transmitted by the IC card application.

An IC card ICC may also comprise other data, such as configuration data on an access point AP. The configuration data may comprise, for example, data on the settings associated with the radio interface, such as the allowed frequency range, or data on the settings between the AP and the fixed network part. For example, if the Internet is used between an AP and the fixed network part, data on the gateway, name server or proxy server to be used can be stored on the ICC. Furthermore, the other data may include different data associated with the use and maintenance of the access point, for example data on the current situation regarding traffic, users, billing, and data on malfunctions and exceptional conditions.

Figure 3:
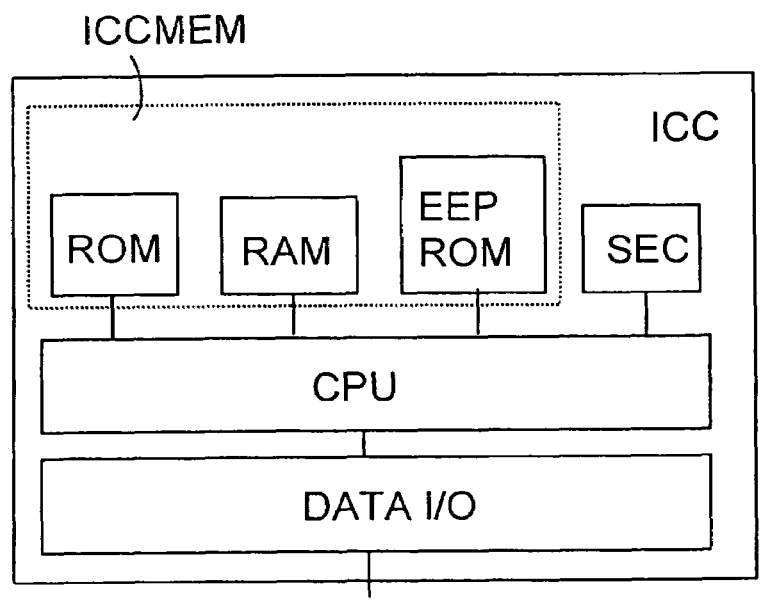
FIG. 3 is a schematic block diagram illustrating the inner structure of an IC card.

FIG. 3 is a schematic block diagram of the internal structure of a known IC card ICC. Typically, an ICC is a plastic card of the size of a credit card and comprises a microcircuit. The surface of an ICC comprises electrical contacts via which operating voltage can be transferred to the card and control and data signals can be transferred between a reading device, such as the card means ICCM of an AP and the bus adaptor DATA I/O of an ICC. In other words, data transmission between an ICC and the ICCM of an access point takes place via the bus adaptor DATA I/O.

The central processing unit CPU controls the operation of an IC card ICC on the basis of a program code stored in a memory ICCMEM, typically a read-only memory ROM. Different user-specific data can be stored substantially permanently in an electrically erasable programmable read-only memory EEPROM. The aforementioned data on the use of an IC card at an AP can preferably be stored in the EEPROM. The data on an ICC is arranged in different directories to which the card and outside devices have different user rights. A random access memory RAM can be used as a temporary data1 storage. To ensure operational safety, an ICC includes a safety function SEC, which attends to PIN checks, for example. As was stated above, an AP comprises card means ICCM for using the ICC, providing mainly reading means for reading electric contacts, and preferably also writing means for writing in the memory of the ICC in accordance with signals issued by the control unit CONTROL.

Depending on the desired implementation, an IC card ICC may comprise several independently operating applications that may issue requests to the control unit CONTROL of an access point AP. As an extreme alternative, the control unit CONTROL can be arranged to control an ICC operating as a slave, whereby the ICC mainly acts as a data storage. In a preferred embodiment, the control unit CONTROL comprises an actual functionality for utilizing the data on the ICC (also potential applications), and preferably also for storing data on the ICC. Between an AP and an ICC, the same physical and logical definitions can be used as between a UICC card comprising an UMTS USIM application (UMTS IC Card) and a UMTS terminal, which are described in greater detail in the 3GPP specification TS 31.101 '*UICC Terminal Interface: Physical and Logical Characteristics*'.

An IC card ICC may also comprise data stored for other purposes, i.e. the IC card may act as a multi-application card. For example data on several different operators may be stored on an ICC, whereby one card can be used to set up connections from an access point AP to the radio network controllers RNC and core networks CN of several operators.

The following describes by way of example the activation of an IC card ICC: the ICC is inserted into an AP whose card means ICCM couple operating voltage thereto. To the AP, the ICC transmits data on its characteristics, for examples protocols supported by it and manufacturer data. If the ICC is acceptable, the AP checks the PIN from the user or, in many cases, from the initializing user, by means of an interface, such as a keyboard, microphone or a touch screen. Security logic SEC checks if the input PIN is correct. If the identifier is correct, the ICC can be used. This ensures that only a user who knows the PIN can use the ICC. User identification may also be carried out in any other way, for example by fingerprint recognition. If user identification is successful, the card is ready for use.

Figure 4:
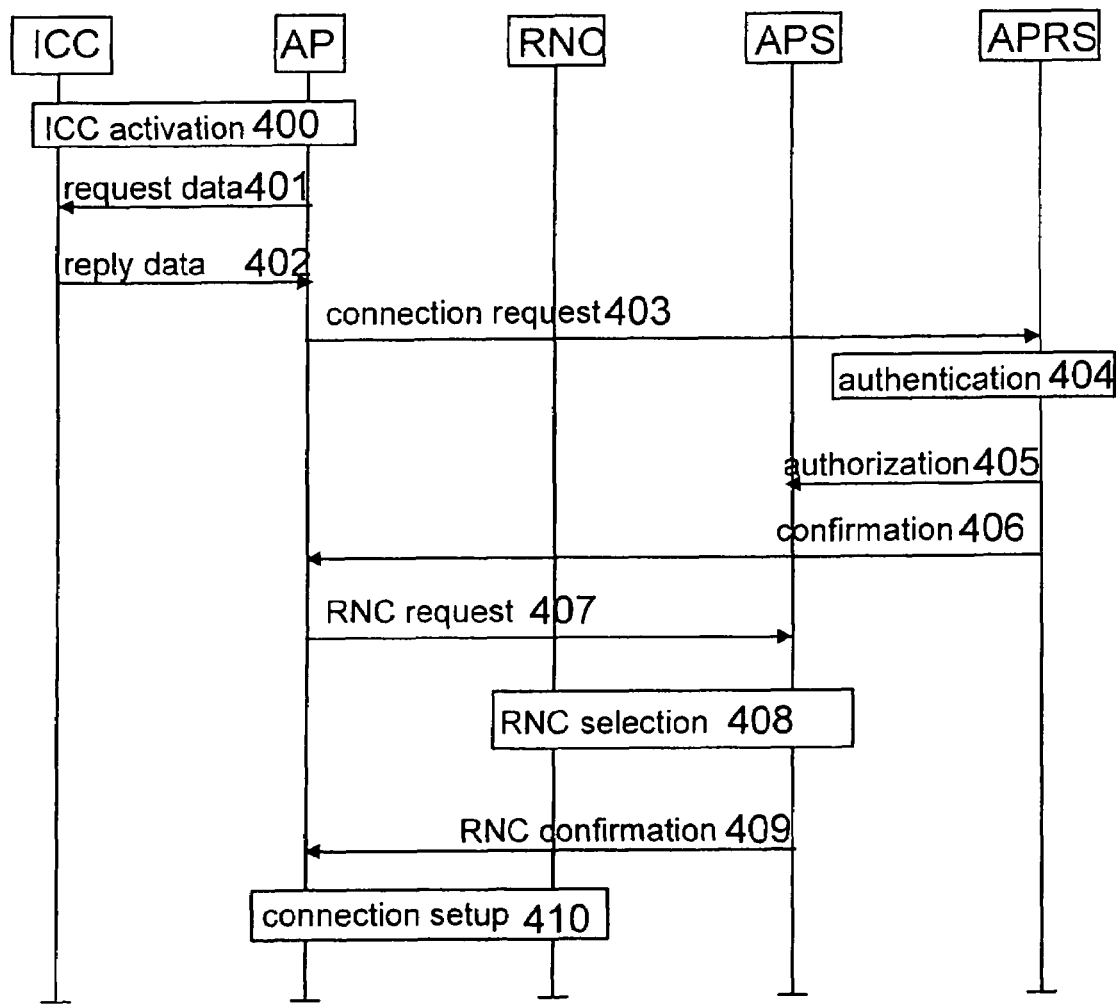
FIG. 4 is a signalling diagram illustrating the connection of an access point to a fixed network part.

Referring to FIG. 4 and taking more closely into account the connection of the access point AP, which operates as a base station, to the fixed network part by means of data comprised by an IC card, the points essential to the invention will be described. When an ICC is activated 400 at an AP (ICC activation), the AP may start searching for the fixed network part element to which it could be connected. If the user has the right to use the ICC (the correct PIN, for example), and card activation is successful, the AP requests 401 (request data) from the ICC directories at least the address data and specific identity of the access point register server APRS. The APRS address may be the IP address, for example. From the ICC a response 402 (reply data) including at least the specific identity and the APRS address data is transmitted, and on the basis of the response the AP can send 403 a connection request including the specific identity to the APRS.

The connection between an AP and an APRS can be set up by utilizing known solutions. For example, if the connection is via the Internet, the VPN technique can be used. Stored on the ICC may be a VPN number, which belongs to the APRS and which the AP can use to encapsulate the packets in such a way that only the APRS can remove the encapsulation. Separate servers comprising VPN functionalities may also be used.

When receiving a connection request 403, the APRS preferably checks if the ICC complying with the transmitted specific identity has the right to use the resources of the fixed network part. Checking the rights preferably comprises checking the data from a database on the basis of the specific identity, and also the authentication of the IC card to make sure that the request is actually received from the IC card ICC. If the data on the ICC is found in the database of the APRS, then the APRS can authenticate 404 (ICC authentication) the ICC on the basis of, on the one hand, the data transmitted from the IC card and, on the other hand, the data comprised by the APRS database. An implementation of the authentication will be described in greater detail later. An AP may also have its own specific identity that the APRS wants to check before it gives the AP the right to set up a connection to the fixed network part. In this case, the AP can transmit its identifier at the APRS's request. The APRS may comprise a list over accepted and/or forbidden devices, whereby it can prevent the access of, for example, access points without type approval to the resources of the fixed network part.

If the ICC is acceptably authenticated and the APRS can authorize the access point to get a connection to the fixed network part, the necessary resources can be reserved from the network part for the AP. The APRS selects an access point server APS for the AP. The APRS may select the APS to be used on the basis of a given existing coupling table or by optimizing the desired parameters. Parameters that can be optimized include the load on the network elements and their capacities, the load on the links and their capacities, minimization of transmission delays, costs. The APRS may search for an advantageous path by utilizing for example routing data on Internet nodes. The APRS may also try to minimize the delay by polling, for example by using a ping command according the IP protocol between the available network resources and the AP. If the link is a rented network, the resources may also be selected by minimizing the transmission costs.

The APRS transmits an authorization 405 to a selected APS and a confirmation 406 about a successful connection request to the AP. The authorization 405 comprises data, preferably a specific identity, on the ICC to which resources can be reserved. The authorization 405 may also comprise data necessary for ciphering, such as a calculated cipher key. For this reason the connection between the APRS and the APS is preferably protected. On the basis of the authorization 405, the APS updates its data with a new AP to be supported. The confirmation 406 also comprises address data on the APS.

When receiving the confirmation 406, the AP may send to the APS a request for connecting the AP to the fixed network part, preferably 407 (RNC request) to a radio network controller RNC. Upon receipt of the request 407, the APS reserves for the AP an RNC 408 (RNC selection) that offers the connection. In this case the data on the new AP, preferably at least the AP's identity and physical address, can be stored in the RNC. The cipher key used is also preferably transmitted to the RNC. Once the RNC is selected, the APS transmits a confirmation 409 thereof (RNC confirmation) to the AP. The confirmation 409 also comprises address data on the selected RNC. The settings of the AP are changed in accordance with the confirmation 409, and a connection 410 can then be set up between the AP and the RNC (connection set-up). The AP can be connected to the RNC by NBAP signalling (NodeB Application Part) according to the Iub interface specifications, which allows the necessary configuration data and control commands to be send from the RNC to the AP. Part of the configuration data needed at this stage, such as data on the allowed frequency range, can also be stored on the ICC, whereby the AP settings are changed so as to conform with the stored configuration data. Part of the RNC resources are reserved for the AP and the RNC cell data is updated by means of one or several AP cells. At the AP, the data to be sent can be preferably ciphered, and the data ciphered by the RNC can be decrypted by a cipher key used on the ICC, whereby data transmission is also secure over an Iub interface via a public network. Similarly, at the RNC, the cipher key transmitted by the APS is also preferably taken into use. An alternative is to use the VPN technique to protect the connection between the AP and the RNC. The AP can also be connected to the necessary CN resources at an SGSN and/or a mobile switching centre 3GMS/VLR. The AP cell id is preferably transmitted to the CN at least in order to arrange billing. In the element attending to billing, the cell id is comparable to a service area, on the basis of which the users on the area of the AP can be billed.

In accordance with a preferred embodiment, once a functional connection with the necessary resources is set up, the RNC and the CN associated wherewith can be utilized by the AP. The AP may start to offer its services to the UE within its coverage area by initiating broadcast transmissions in its cell on a BCH channel (Broadcast Channel) (BCH broadcast) and starting to monitor the RACH channel (Random Access Channel). If the invention is applied to the UMTS FDD mode, for implementing macrodiversity, the AP can be connected, not only to the RNC, but also into functional connection with one or several access points. The connection between access points is typically via an RNC.

Figure 5:
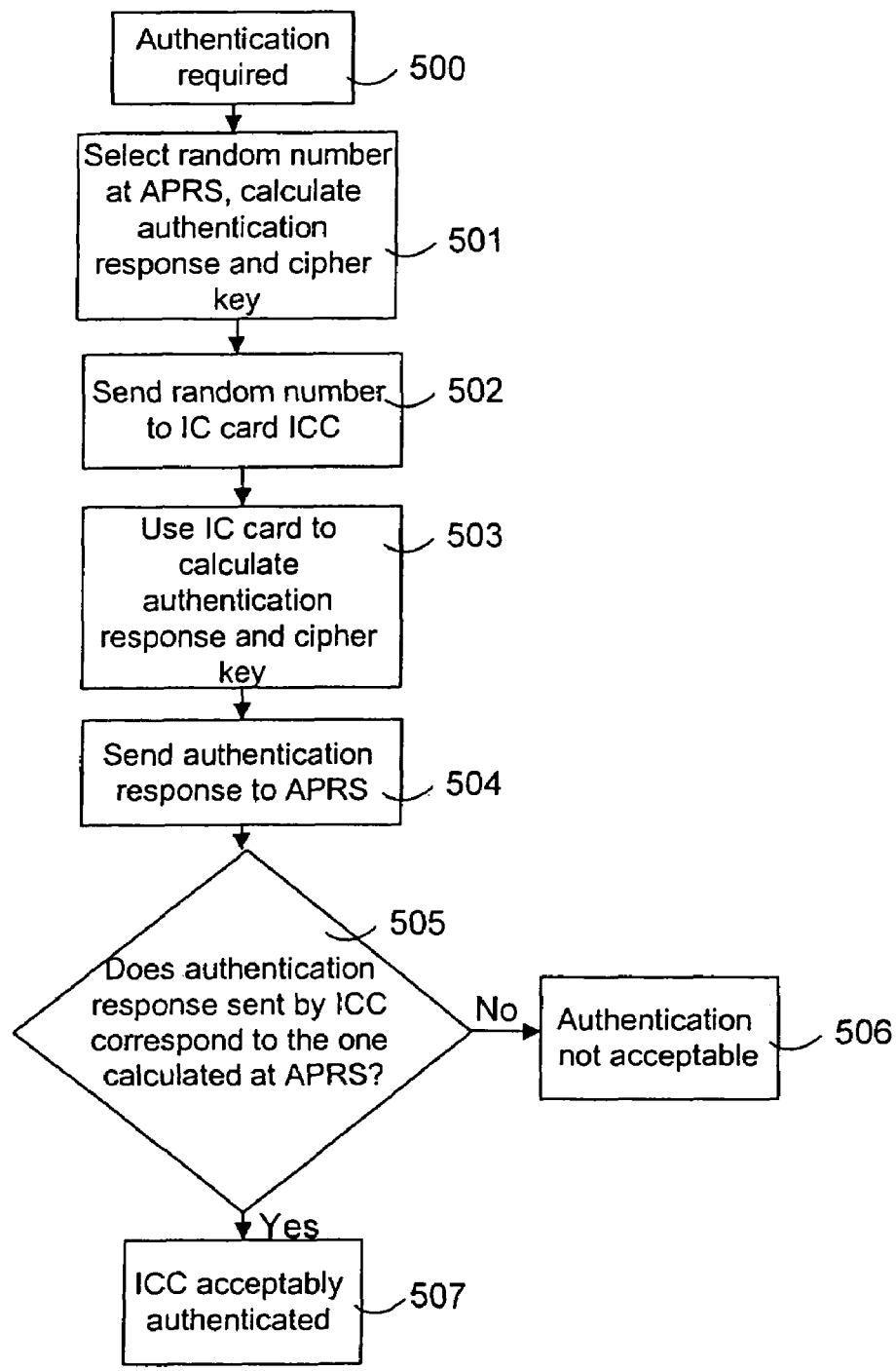
FIG. 5 illustrates a manner of authenticating an IC card.

An ICC can be authenticated in a variety of ways. FIG. 5 illustrates an authentication method in which the cipher keys to be used are also calculated. Authentication can start 500 for example on the basis of a request sent by an AP. In the APRS, a random number parameter is selected 501 for the ICC, and the cipher key according to the ICC card's specific identity and the random number are used to calculate an authentication check parameter, i.e. the authentication response and cipher key. The random number parameter and an optional check identifier to be used for identifying the counter party are transmitted 502 to the AP whose control means CONTROL are arranged to transmit a request containing the received data for authentication and calculation of the cipher key to the ICC. If the check identifier is acceptable, the ICC calculates 503 the authentication response and the cipher key on the basis of the random number and the cipher key using ciphering/authentication algorithms. The ICC transmits 504 the calculated authentication response to the AP whose control means CONTROL transmit it to the network to the APRS. The APRS compares 505 the calculated authentication response with the authentication response calculated on the IC card. If the authentication response calculated in the network and the authentication response calculated on the ICC are identical, the authentication is acceptable 507, and it has been confirmed that the ICC is authentic and complies with the data in the APRS. If the authentication responses are not identical, the authentication is not acceptable 506. The APRS and the ICC may also transmit the calculated authentication responses to the APS, which will carry out the comparison. If the authentication is successful 507, the cipher keys can be transmitted to the elements carrying out the ciphering, such as to the transceiver means TXRX of the AP and to the RNC.

As was mentioned above, an ICC can be utilized for tasks related to the use, maintenance or monitoring of an AP. When an AP is connected to a fixed network part, to an RNC and, typically, further to a CN, the ICC can be authenticated at given intervals to maintain a functional connection, and the cipher key to be used can also be changed to ensure adequate security. The functional connection can be released on the basis of a request sent by the AP or when desired by the owner of the IC card, for example the operator managing the CN. When the functional connection between an AP and a fixed network part is released, the data of the AP can be deleted from the RNC and the APS.

It should be noted that the connection of an AP to the resources of a fixed network part, as described for FIG. 4, is only an example of an implementation, and the actual signalling sequence can be implemented in many different ways, in such a manner, however, that in a preferred embodiment the AP initiates the signalling using an APRS address stored on the ICC. Without an ICC, an AP can function as access points AP function currently, i.e. wait for guidance from a fixed network part instead of actively starting to log on to the network. Furthermore, contrary to the above description, an ICC can be inserted into a device, for instance a router, which is in a functional connection with an AP. Via this device, the IC card can be used for connecting the AP and the resources of the fixed network to a functional connection.

The above describes the utilization of an IC card ICC at access points AP that are base stations or nodes B of a UMTS system. As was stated above, an access point in a wireless telecommunication system may also be a radio network controller controlling the base stations, in which controller the ICC can be utilized in accordance with the invention. The ICC can be utilized at the RNC for connecting the RNC to a functional connection with the resources of the fixed network part, mainly with the network elements of the core network CN. In this case the RNC comprises card means for using an ICC, control means and a transceiver for setting up a functional connection to the necessary fixed network resources on the basis of the data stored on the IC card. Table 1 shows the data that can be stored on an ICC, preferably a specific identity, an APRS address, data needed for authentication and ciphering. If servers APS and APRS are not used in accordance with FIG. 2, the APRS and the APS may be located in the CN. As was stated above, the APRS contains data for checking the rights of an ICC, preferably by means of a specific identity and authentication. The APS serves to control one or more CN elements, such as a mobile switching centre 3GMSC/VLR or an operating node SGSN, to connect their resources in a functional connection with the RNC. An access point (RNC) can be connected as shown in FIG. 4, with the exception that connection is made to the CN. In this case, when the APRS gives the APS a command to connect the RNC, and the RNC optionally requires connection from the APS, the APS transmits data on the RNC to be connected to the CN elements, i.e. the operating node SGSN and/or the mobile switching centre 3GMSC/VLR. The request contains at least data on the physical address of the RNC. In the CN, an RNC-id for identifying the RNC may be taken into use and used to distinguish between the different radio network controllers. A point-to-point link is set up between at least one CN element and an RNC, and the RNC is bound to a given area at the CN element, such as a location are (at the mobile switching centre 3GMSC/VLR) or a routing area (at the operating node SGSN). Actual signalling and data links are set up between the CN and the RNC by RANAP signalling (Radio Access Network Application). Necessary data, such as cell identifiers, on the base stations under the RNC can be transmitted to the CN. This way a functional connection is set up between the RNC and one or more CN resources, whereby the RNC and the base stations it controls can be reliably offered the services of the CN. The ICC can be authenticated for example as shown in FIG. 5, and the traffic between the RNC and the fixed network part can be ciphered by utilizing the calculated cipher keys.

An IC card ICC can also be used for connecting access points offering only wired connections, such as broadband modems (for example ADSL, Asynchronous Digital Subscriber Line), to other elements of a telecommunication system, such as a telephone exchange. In this case the data on the ICC can also be used in the necessary authentications and cipherings.

It is obvious to a person skilled in the art that as technology advances, the basic idea of the invention can be implemented in a variety of ways in public or private networks. Consequently, the invention and its embodiments are not restricted to the above-described examples, but may vary within the scope of the claims.

What is claimed is:

1. A method of connecting an access point to other network elements in a PLMN (Public Land Mobile Network) wireless telecommunication system having at least the access point and at least one fixed network part, wherein the access point is a base station with at least one transceiver for offering a wireless connection to a terminal, the method comprising:

storing data on an IC card for connecting at least one access point to a functional connection with the fixed network part, connecting the IC card inserted in the access point by an IC card reader in the access point in response to a need to connect the access point to the fixed network part, and receiving at least address data related to the fixed network part from the IC card, and, connecting necessary resources of the fixed network part to a functional connection with the access point on the basis of said data from the IC card, wherein said data stored on said IC card includes an address of at least one fixed network part element and a specific identity of the IC card, the fixed network part element also comprises data on the IC card, assorted by the specific identity, the method further comprising the steps of:

transmitting a request for connecting the access point to the network element of the fixed network part on the basis of the stored address, and checking the rights of the IC card by checking the data on the IC card on the basis of the specific identity and by authenticating the IC card.

2. A method as claimed in claim 1, further comprising the steps of:

checking in the fixed network part if the IC card is entitled to use the necessary resources of the fixed network part, and connecting the necessary resources of the fixed network part to a functional connection with the access point in response to the IC card having the right to use the resources of the fixed network part.

3. A method as claimed in claim 1, wherein said data includes at least one key and algorithm required for authenticating the IC card, the method further comprising the steps of:

transmitting an authentication response, calculated by means of at least one key and algorithm, to the fixed network part, authenticating the IC card by checking the transmitted authentication response in the fixed network part, and connecting the access point to a functional connection with the resources of the fixed network part in response to the authentication response being acceptable.

4. A method as claimed in claim 1, wherein said data includes at least one key and algorithm for ciphering the connection between the access point and the fixed network part, and the method further includes the step of ciphering the traffic between the access point and the fixed network part by utilizing at least one key and algorithm.

5. A method as claimed in claim 1, wherein the fixed network part comprises at least one radio network controller, an access point server, and an access point register server in a functional connection thereto and includes stored data relating to the IC card, the method further comprising the steps of:

transmitting a specific identity of the IC card to the access point register server, checking a right of the IC card to use the resources of the fixed network part, selecting an access point server for the access point in response to the IC card having the right to use the resources of the fixed network part, transmitting data on the selected access point server to the access point and data on the access point to be connected to the access point server, transmitting from the access point to the access point server a request for selecting a radio network controller, selecting a radio network controller for the access point, and connecting the access point to a functional connection with the radio network controller and other optionally required resources.

6. A method as claimed in claim 5, further comprising the steps of:

calculating at least one cipher key and authentication response in the IC card and in the access point register server, transmitting the authentication response calculated in the IC card to the access point register server, authenticating the IC card by checking if the transmitted authentication response corresponds to the authentication response calculated in the access point register server, and connecting, in response to an acceptable authentication, the access point to a functional connection with the radio network controller in such a manner that the traffic between the access point and the radio network controller is ciphered by the calculated cipher keys.

7. A method as claimed claim 1, wherein the IC card comprises a security function for checking a user of the IC card, and wherein other data, in addition to said data related to the use of the access points, is stored on the IC card.

8. A method as claimed in claim 1, wherein the access point is a base station in a UMTS system, and the fixed network part comprises at least a UMTS system radio network controller RNC.

9. A method as claimed in claim 1, wherein the access point is a UMTS system radio network controller RNC and the fixed network part comprises one or more network elements of a core network of a UMTS system.

10. A PLMN (Public Land Mobile Network) wireless telecommunication system comprising at least one access point and at least one fixed network part, wherein:

the access point is a base station having at least one transceiver and configured to offer a wireless connection to a terminal, the access point is arranged to connect an IC card inserted in the access point by an IC card reader in the access point, onto which IC card is stored data for connecting at least one access point to a functional connection with the fixed network part, and the access point is arranged to receive at least address data related to the fixed network part from the IC card, and the access point and the fixed network part are arranged to connect necessary resources of the fixed network part to a functional connection with the access point on the basis of said data from the IC card, wherein:

said data stored on said IC card comprises an address of at least one fixed network part element and a specific identity of the IC card, the fixed network part element also comprises data on the IC card, assorted by the specific identity, the access point is arranged to transmit a request for connecting the access point to the network element of the fixed network part on the basis of the stored address, and the network element of the fixed network part is arranged to check rights of the IC card by checking the data on the IC card on the basis of the specific identity and by authenticating the IC card.

11. A wireless telecommunication system as claimed in claim 10, wherein the fixed network part is arranged to check if the IC card is entitled to use the necessary resources of the fixed network part, and the access point and the fixed network part are arranged to connect the access point and or necessary resources of the fixed network part to a functional connection in response to the IC card being entitled to use the necessary resources of the fixed network part.

12. A wireless telecommunication system as claimed in claim 10, wherein:

the fixed network part comprises at least one radio network controller, an access point server, and an access point register server in a functional connection thereto and includes stored data on the IC card, the access point is arranged to transmit a specific identity of the IC card to the access point register server, the access point register server is arranged to check a right of the IC card to use the necessary resources of the fixed network part, the access point register server is arranged to select an access point server for the access point in response to the IC card being entitled to use the necessary resources of the fixed network part, the access point register server is arranged to transmit data on the selected access point server to the access point and data on the access point to be connected to the access point server, the access point is arranged to transmit to the access point server a request for selecting a radio network controller, the access point server is arranged to select a radio network controller for the access point, and the access point and the fixed network part are arranged to connect the access point to a functional connection with the radio network controller and other optionally required resources.

13. A wireless telecommunication system as claimed in claim 12, wherein the IC card and the access point register server are arranged to calculate at least one cipher key and authentication response, the access point is arranged to transmit the authentication response calculated in the IC card to the access point register server, the access point register server is arranged to authenticate the IC card by checking if the transmitted authentication response corresponds to the authentication response calculated in the access point register server, and the access point and the fixed network part are arranged to connect, in response to an acceptable authentication, the access point to a functional connection with the radio network controller in such a manner that traffic between the access point and the radio network controller is ciphered by the calculated cipher keys.

14. An access point for a PLMN (Public Land Mobile Network) wireless telecommunication system, wherein:

the access point is a base station configured to offer a wireless connection to a terminal, the access point is configured to connect an IC card inserted in the access point allow for reading data on the IC card, by an IC card reader in the access point, the access point is configured to receive at least address data from the IC card, and the access point comprises a controller and at least one transceiver for setting up a functional connection to required resources of a fixed network part on the basis of the data stored on the IC card, wherein said data comprises an address of at least one fixed network part element and a specific identity of the IC card, the control means are arranged to send a request including a specific identity of the IC card for connecting the access point to a network element of the fixed network part on the basis of the stored address, and the control means are arranged to set up a functional connection to at least one network element of the fixed network part in response to an accepted request for connecting the access point determined by checking the data stored on the IC card on the basis of the specific identity and by authenticating the IC card.

15. An access point in a wireless telecommunication system as claimed in claim 14, wherein the control means are arranged to transmit a request to the IC card for calculating an authentication response and at least one ciphering key, the control means are arranged to transmit the authentication response calculated on the IC card to the fixed network part, and the transceiver means are arranged to cipher the data to be sent to the fixed network part and to decrypt the data received from the fixed network part by means of at least one ciphering key calculated on the IC card.

16. An access point as claimed in claim 14, wherein the access point is a base station in the wireless telecommunication system.

17. An access point as claimed in claim 14, wherein the access point is a radio network controller controlling one or more base stations in the wireless telecommunication system, and the fixed network part comprises one or more wireless network elements of a core network of the telecommunication system.

18. The method of claim 5, wherein the stored data relating to the IC card includes the specific identify of the IC card.

19. The method of claim 7, wherein the other data stored on the IC card includes data required in UMTS system USIM application.

20. The system of claim 12, wherein the stored data relating to the IC card includes the specific identify of the IC card.

* * * * *